(12) United States Patent  (10) Patent No.: US 8,458,075 B2
Dieker et al.  (45) Date of Patent: Jun. 4, 2013

(54) METHOD AND APPARATUS FOR COMMODITY SOURCING MANAGEMENT

(75) Inventors: Antonius B. Dieker, Atlanta, GA (US); Yingdong Lu, Yorktown Heights, NY (US); Mark S. Squillante, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 13/006,960

(22) Filed: Jan. 14, 2011

(65) Prior Publication Data

US 2012/0185405 A1    Jul. 19, 2012

(51) Int. Cl.
*G06Q 40/00* (2012.01)
(52) U.S. Cl.
USPC ........ 705/36 R; 705/1.1; 705/7.11; 705/7.23; 705/7.28; 705/7.29
(58) Field of Classification Search
USPC ................... 705/1.1, 7.11, 7.23, 7.28, 7.29
See application file for complete search history.

(56) References Cited

U.S. PATENT DOCUMENTS

| | | | |
|---|---|---|---|
| 2002/0138371 A1* | 9/2002 | Lawrence et al. | 705/27 |
| 2006/0036458 A1* | 2/2006 | Thursfield et al. | 705/1 |
| 2007/0106594 A1* | 5/2007 | Vlahoplus et al. | 705/37 |
| 2009/0313052 A1* | 12/2009 | Ford | 705/4 |

OTHER PUBLICATIONS

Anonymous. How to calm inventory chaos through 'synergy'. Inventory Reduction Report; Oct. 1998; 98, 10; ProQuest Central. p. 2.*
Timothy Laseter. Supply Management Strategy: Seven rules for creating winning sourcing strategies. Purchasing Buylines; May 21, 2998; 124, 8; ProQuest Central. p. 28.*
Trent, et al. Effective cross-functional sourcing teams: Crital success factors. International Journal of Purchasing and Materials Management; Fall 1994; 30, 4; ProQuest Central. p. 3.*

* cited by examiner

*Primary Examiner* — Muriel Tinkler
(74) *Attorney, Agent, or Firm* — Scully, Scott, Murphy & Presser, P.C.; Daniel P. Morris, Esq.

(57) ABSTRACT

A method for commodity sourcing management or commodity management includes identifying a plurality of divisions of commoditization. A plurality of sourcing options for at least one of the divisions of commoditization are identified, as well as a plurality of financial instruments. The method includes correlating the plurality of divisions of commoditization, the sourcing options and the financial instruments so that they are commonly commensurable for analysis.

24 Claims, 3 Drawing Sheets

METHOD AND APPARATUS FOR COMMODITY SOURCING MANAGEMENT

FIELD OF THE INVENTION

The present invention relates to a method for managing commodity sourcing, and more particularly, a method for managing commodity sourcing by corresponding parameters associated with the commodity sourcing decision process.

BACKGROUND OF THE INVENTION

Commodity management is important in a company's ability to deliver projects, grow revenue and be more profitable. In order to deliver successful commodity-based project and services, the right resources for a job must have compatible capabilities to be able to deliver goods or services when needed.

Currently there are few if any methodologies to meet the above need. Typical methods do not address managing sourcing strategies or policies for divisions of commoditization in a quantitative framework which may include financial considerations.

Therefore, it would be desirable to provide a method, and system for implementing the method, for providing methodologies for determining the capabilities needed to satisfy a forecasted demand for a project, or service, or the like. It would further be desirable to provide a method for determining a desirable sourcing strategy or policy for the capabilities required for a project or service.

SUMMARY OF THE INVENTION

In an aspect of the invention, a method for commodity sourcing management comprises: identifying a plurality of divisions of commoditization; identifying a plurality of sourcing options for at least one of the divisions of commoditization; identifying a plurality of financial instruments; and correlating the plurality of divisions of commoditization, the sourcing options and the financial instruments so that they are commonly commensurable for analysis.

In a related aspect, the step of correlating the plurality of divisions of commoditization further comprises: managing the divisions of commoditization and the corresponding sourcing options using the financial instruments and the correlation of the plurality of divisions of commoditization for hedging against future uncertainty and achieving specified business objectives. In a further related aspect, the method further comprises: determining a parameter data set for the commodity sourcing solution; and generating the commodity sourcing solution from the correlating step and the parameter data set. The parameter data set may include risk levels, and cost considerations. The correlating step may include a risk analysis. The method may further comprise: repeating the steps of claim 1 for each of a plurality of periods of time within a specified time period; and selecting a desired commodity sourcing solution for the specified time period.

In another aspect of the invention, a method for commodity sourcing management comprises: providing multiple periods of time within a specified period of time; iterating, for each period of time, the steps of: identifying a plurality of divisions of commoditization; identifying a plurality of sourcing options for at least one the divisions of commoditization; identifying a plurality of financial instruments; and correlating the divisions of commoditization, the sourcing options, and the financial instruments over the specified period of time such that the divisions of commoditization, the sourcing options, and the financial instruments are commonly commensurable for analysis.

In another aspect of the invention, a method for commodity management comprises: determining a plurality of divisions of commoditization wherein each of the divisions of commoditization include at least one capability associated with each of the divisions of commoditization; determining a plurality of sourcing options for at least one of the divisions of commoditization; determining a plurality of value instruments for associating a value to each of the divisions of commoditization, wherein at least one of the value instruments is a financial instrument; associating each of the sourcing options to the value instruments; correlating the divisions of commoditization and the sourcing options and the value instruments; and generating a commodity sourcing solution.

In another aspect of the invention, a computer program product comprising a computer readable storage medium having recorded thereon a computer program. A computer system includes the computer readable storage medium and a processor for executing the steps of the computer program for commodity sourcing management on the computer system, the program steps comprise: identifying a plurality of divisions of commoditization; identifying a plurality of sourcing options for at least one of the divisions of commoditization; identifying a plurality of financial instruments; and correlating the plurality of divisions of commoditization, the sourcing options and the financial instruments so that they are commonly commensurable for analysis.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
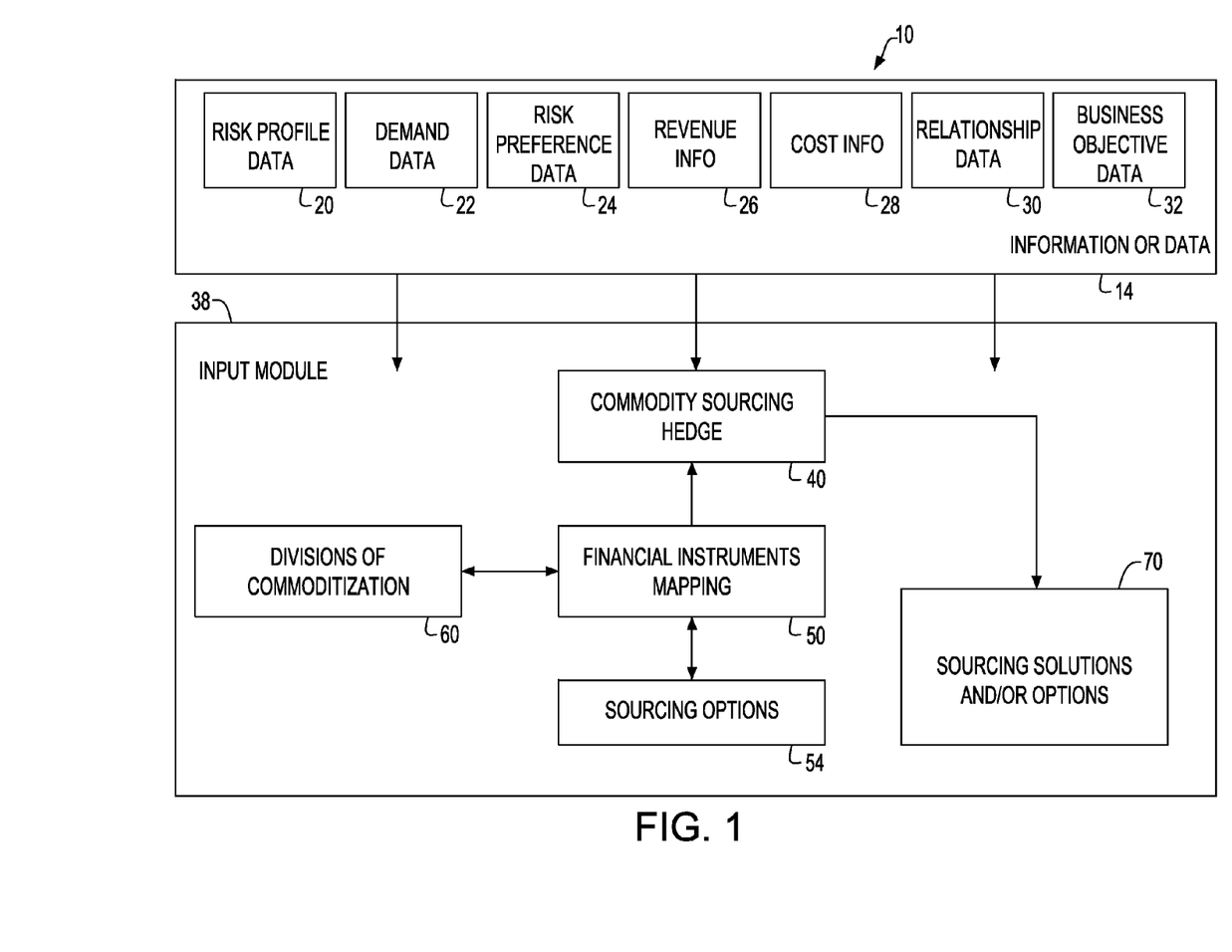
FIG. 1 is a schematic diagram according to an embodiment of the invention depicting a method of the invention.
Figure 2:
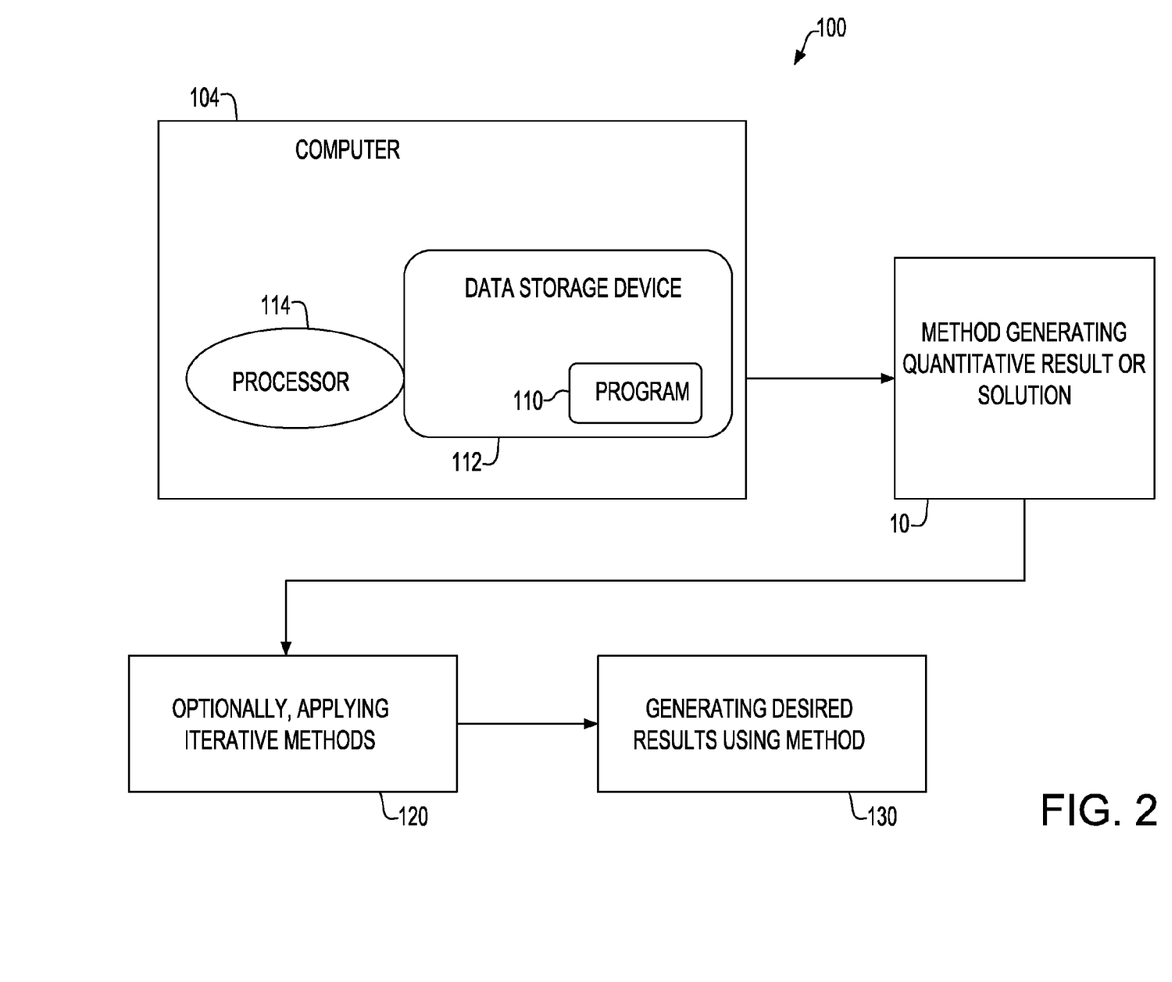
FIG. 2 is a schematic block diagram depicting a computer for executing the method shown in FIG. 1 and method steps.

Referring to FIGS. 1 and 2, an illustrative embodiment of the present invention includes a method 10 (FIG. 1) implemented on a computer system 104 (FIG. 2) for commodity sourcing management as part of a process 100. The method includes defining a plurality of parameters 14 providing information or data. The data parameters 14 are received by a commodity sourcing analysis input module 38. The input module 38 includes a commodity sourcing hedge analysis module 40. The hedge analysis module 40 also receives data from a financial instruments mapping module 50. The financial instruments mapping module 50 communicates with a division of commoditization module 60 and a sourcing options module 54. The commodity sourcing hedge module 40 generates results or commodity sourcing solutions 70. The commodity solutions 70 include the best, nearly best, or desired sourcing options for all divisions of commoditization to meet product or service output demand while hedging against future uncertainties or volatilities. The commodity sourcing solution 70 may also recommend business actions to achieve the desired portfolio of commodity sourcing solutions. The data parameters 14 are stored in data storage 112 (FIG. 2), along with data from the commodity sourcing hedge analysis module 40, and modules 50, 60 and 54. The hedge module 40 and modules 50, 60 and 54 may be embodied as modules of a commodity sourcing management program 110 stored on computer readable medium embodied as the data storage device 112. The management program 110 is executed by a processor 114 in a computer 104.

More particularly, referring to FIG. 1, the data parameters 14 include a risk profile 20 including, for example, demand volatility, perturbation analysis, and other risk analysis. The data parameters 14 further include demand data 22 including, for example, divisions of commoditization, sourcing options. Risk preference data 24 includes, for example, a criteria to meet fifty percent of demand with a particular sourcing options. Revenue information data 26 includes, for example, market revenue of divisions of commoditization and related sourcing options. Cost information data 28 includes, for example, market costs of divisions of commoditization and their sourcing options. Relationship data 30 includes, for example, associations between divisions of commoditization and between sourcing options. Business objectives data 32 includes, for example, revenue targets, cost targets, and profit targets. The information parameters 14 are analyzed by all the modules in the information module 38, i.e., the hedge analysis module 40, the divisions of commoditization module 60, the financial instruments mapping module 50, and the sourcing options module 54.

The method of the present invention focuses on identifying divisions of commoditization 60, identifying different types of sourcing options/alternatives for the divisions of commoditization 60, and determining a portfolio of sourcing strategies/policies 54 for the divisions of commoditization 60 to meet objectives of interest specified in the program 110.

For example, in a commodity management context, problems can arise when a company's business unit needs to define the divisions of commoditization within its organizational structure, define the various sourcing options/alternatives available to the business unit, and determine the portfolio of sourcing options/alternatives that will be used for each division of commoditization in order for the business unit to deliver its products, services, etc. and meet its business objectives.

In another example, in a strategic planning context, problems can arise when a company's corporate strategy department needs to define the strategic divisions of commoditization within the company, define the various strategic sourcing options/alternatives available to the company, and determine the portfolio of sourcing policies that will be used by the company to meet overall corporate strategies and long-term business objectives.

Another example, in an economic planning context, problems can arise when a government or municipality needs to define the divisions of commoditization to drive its economy, define the various sourcing options/alternatives available to the government or municipality for these divisions of commoditization, and determine the portfolio of sourcing strategies/policies that will be used by the government or municipality to meet its long-term economic objectives.

The examples are intended to be illustrative, as one skilled in the art will understand that the present invention is not limited to these examples and that similar problems and issues arise in many different contexts and types of organizations. Generally, the present invention provides solutions for the above problems for any entity in which the problems arise.

The invention includes establishing and exploiting connections (in both directions) between divisions of commoditization 60 within an entity and financial instruments 50. The embodiments of the invention herein include financial instruments, however, other types of value instruments may be used. One example of a division of commoditization is dividing commodity resources based on capabilities. A capability is connected to a financial instrument 50, where one example of a financial instrument is a bond or a stock. In the preferred embodiment, the market value of a capability can be connected to the price of a financial instrument. The revenue earned by a capability can be connected to the return of a financial instrument, where one example is the dividends for a stock. The relationships among different capabilities can be connected to the relationships among different stocks. Quantitative financial frameworks can be used to establish and exploit connections among divisions of commoditization 60 and financial instruments 50 in order to identify a set of divisions of commoditization for an entity. The set of divisions of commoditization include selecting appropriate divisions of commoditization, creating new divisions of commoditization, and managing the divisions of commoditization. The present invention also includes optionally generating iterative methods 120 to obtain the final solution. The iterative methods solution is discussed with reference to FIG. 3 below.

The connections of relationships among capabilities of divisions of commoditization 60 and financial instruments 50 can, for example, further involve group relationships among sets of capabilities and sets of financial instruments according to various criteria. An illustrative example is where a set of capabilities are grouped based on affinity among them, a set of stocks are grouped based on a common industry, and the connections of relationships are established between the two groups. Under such connections, these relationships and corresponding quantitative financial framework methods can be exploited to manage these divisions of commoditization over time for an entity. These connections further help to reveal and analyze relationships among divisions of commoditization within each group, as well as across each group. For example, capabilities within a group may have correlations in the marketplace with respect to their value or their revenue potential or both.

In another example, the relationship data 30 between capabilities and financial instruments, together with corresponding quantitative financial framework methods, can be further developed to introduce new divisions of commoditization, as well as eliminate or merge existing divisions of commoditization for an entity. For instance, defining a new financial product based upon a set of existing financial products, together with related quantitative financial framework methods can be modeled to introduce a new division of commoditization based upon a set of existing divisions of commoditization. Moreover, sophisticated risk analysis, risk management and risk hedging mechanisms in quantitative financial frameworks can be introduced and exploited to evaluate, mitigate and manage the risks associated with the divisions of commoditization employed within an entity. Furthermore, the strategies and policies employed by an entity with respect to managing and investing in its divisions of commoditization, can be analyzed and determined by modeling the corresponding methods for consuming, investing, etc. in quantitative financial frameworks.

Moreover, for example, an evaluation of the market value for a capability can depend upon the investment in the capability, the demand for the capability, the availability of the capability in the marketplace, the importance of the capability for the entity, and information about relevant competitors. The cost may also be considered, as the total expenses needed to maintain a desired or specified level of a particular capability within an entity is evaluated.

Another component of the invention includes establishing and developing connections (in both directions) between sourcing of divisions of commoditization 54 within an entity, and financial instruments 50 which may include related methods. The present invention evaluates the nature of work to be done by or within an entity, and also identifies the sourcing characteristics of how this work will be done. For example, a type of commodity may be delivered by resources in different locations (e.g., global resources within the entity), or by resources not employed by the entity (e.g., subcontractors or vendors), or through various relationships established by the entity (e.g., subsidiaries or partnerships). Considering these aspects in analyzing the connections between divisions of commoditization 60 and financial instruments 50 and methods, the sourcing options dimension 54 introduces an analogous set of issues to the divisions of commoditization issues.

The relationships between sourcing 54 of divisions of commoditization 60, e.g., the strategy and policies for the various ways in which divisions of commoditization will be delivered (including global resources, subcontractors, vendors, subsidiaries, partnerships, etc.), and financial instruments 50 together with corresponding quantitative financial framework methods can include the distribution of the available investment among different financial instruments. One illustrative example includes evaluating sourcing options 54 of regular in-house resources and subcontracted resources for a capability and the relevant financial instruments, with the total expenses for such sourcing options 54 at a given level within an entity and financial instruments 50, as well as, the transaction costs between the sourcing options 54 and financial instruments 50. A sourcing option 54 alternative for a capability is connected to a financial instrument 50, where one example of a financial instrument is a bond or a stock. In one embodiment, the market value of a sourcing option 54 for a capability is connected to the price of a financial instrument 50. The revenue earned by a sourcing option 54 for a capability can be connected to the return of a financial instrument 50, where one example is the dividends for a stock. The relationships among different sourcing options 54 for a capability, as well as different sourcing options 54 for different capabilities, can be modeled after the relationships among different stocks. The examples are intended to be illustrative, and can apply to many sourcing options of divisions of commoditization and many financial instruments.

The relationship between sourcing options 54 for capabilities and financial instruments 50 can further involve group relationships among sets of sourcing options 54 for capabilities and sets of financial instruments 50 according to various criteria. In one example, a set of sourcing options 54 for a capability (or a set of sourcing options/alternatives for a set of capabilities) are grouped based on an affinity among them, a set of stocks are grouped based on a common industry, and the relationships are established between the two groups. In the example, the relationships and corresponding quantitative financial framework methods can be exploited to manage these sourcing options 54 of divisions of commoditization 60 over time for an entity. These connections further help to reveal and analyze relationships among sourcing options 54 of divisions of commoditization 60 within each group, as well as across each group, in the entity. For example, sourcing options for capabilities within a group may have correlations in the marketplace with respect to their value or their revenue potential or both.

The relationships among sourcing options 54 for capabilities (within divisions of commoditization 60) and financial instruments 50, together with corresponding quantitative financial framework methods, can be exploited to introduce new sourcing options 54 of divisions of commoditization, as well as eliminate or merge existing sourcing options 54 of divisions of commoditization 60, for an entity. As a representative example, the innovation of financial derivatives, namely the practice of defining a new financial product based upon a set of existing financial products, together with related quantitative financial framework methods can be exploited to introduce a new sourcing option 54 of a division of commoditization 60 based upon a set of existing sourcing options 54 of divisions of commoditization 60. Moreover, sophisticated risk analysis, risk management and risk hedging mechanisms in quantitative financial frameworks can be introduced and exploited to evaluate, mitigate and manage the risks associated with the sourcing options 54 of divisions of commoditization 60 employed within an entity. Furthermore, the strategies and policies employed by an entity with respect to managing and investing in its sourcing options 54 of divisions of commoditization 60 can be analyzed and determined by modeling the corresponding methods for consuming, investing, etc. in quantitative financial frameworks.

An evaluation of the market value for a sourcing option 54 for a capability (or collection of capabilities) can depend upon the investment in this sourcing option 54 for the capability, the demand for the sourcing option 54 for the capability, the availability of this sourcing option 54 for the capability within an entity or in the marketplace, the importance of the sourcing option 54 for the capability within an entity or in the marketplace, information about relevant competitors and their sourcing policies. Many other factors, such as the ability or inability of a sourcing option 54 for a capability to provide benefits to other resources or capabilities (e.g., improved efficiencies or effectiveness) or other aspects of the entity, can contribute to the market value for a sourcing option/alternative for a capability (or collection of capabilities). A further consideration includes the total expenses of a sourcing option 54 for a capability (or collection of capabilities) at a given level within an entity. Additional relative costs of sourcing options 54 for a capability (or collection of capabilities) can be connected with the transaction costs among different financial instruments.

A final component of the invention is to develop the above connections together with the models and techniques in the field of financial mathematics and quantitative financial frameworks to determine the best, nearly best, or desired sourcing strategies and policies for divisions of commoditization to meet the needs of the entity. The determination includes sophisticated risk analysis, risk management and risk hedging mechanisms in quantitative financial frameworks, which can be introduced and developed to evaluate, mitigate and manage the various sources of risk associated with the best or nearly best sourcing strategies and policies for divisions of commoditization employed within an entity. Furthermore, the strategies and policies employed by an entity with respect to managing and investing in its sourcing strategies/policies 54 of divisions of commoditization 60 can be analyzed and determined by exploiting the corresponding methods for consuming, investing, in quantitative financial frameworks. Best or nearly best sourcing strategies and policies are with respect to any criteria desired by the entity. Examples of the criteria for the best sourcing strategies include functions of profit, revenue, cost, market share, customer satisfaction, resource effectiveness, business strategy, business objectives, any risks associated with overall capabilities distribution, and various sources of uncertainty. Any one or combinations of the criteria may be used.

Figure 3:
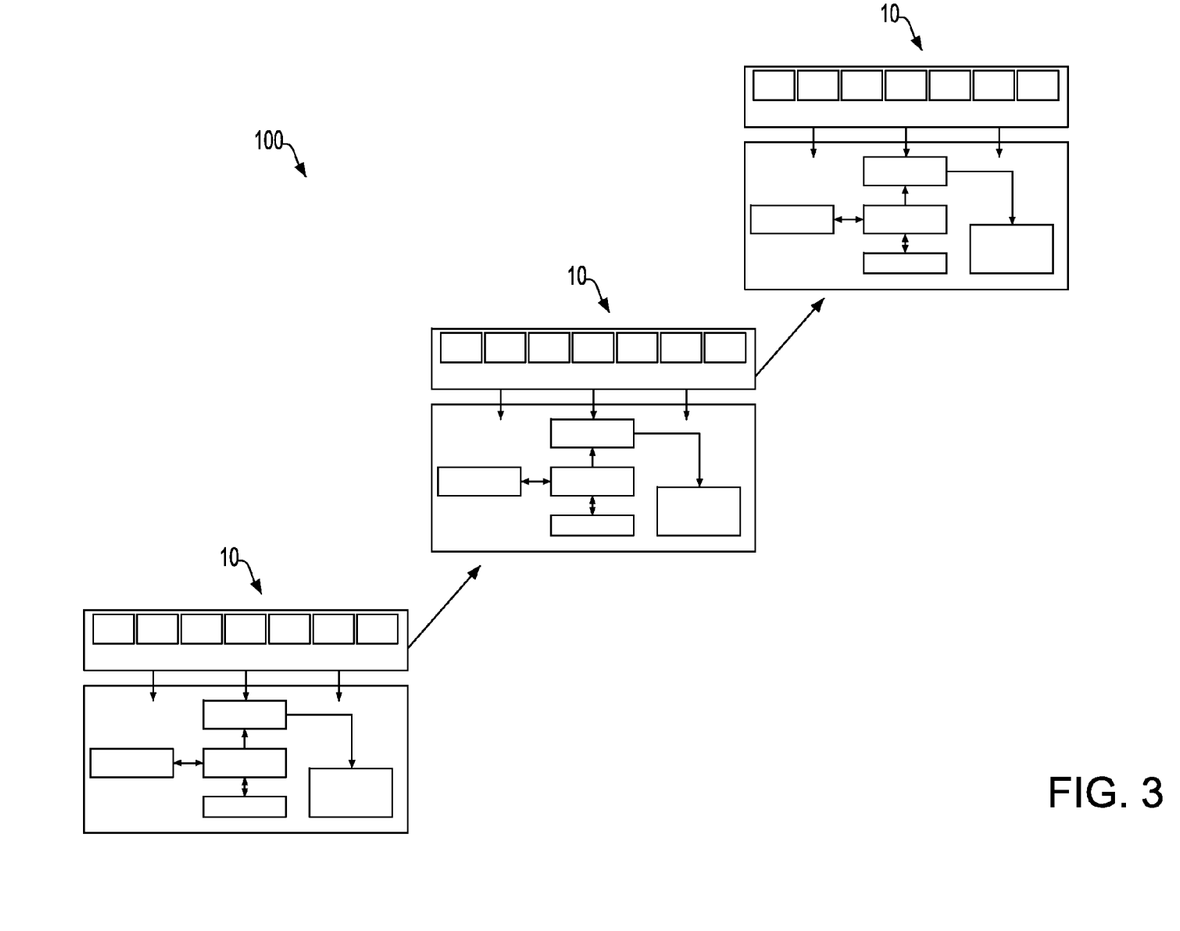
FIG. 3 is a schematic diagram according to an embodiment of the invention depicting a multi-period embodiment of the method of the invention shown in FIG. 1.

Referring to FIG. 3, multiple applications of the method 10, depicted in FIG. 1, are applied to specified periods of time. For example, the method 10 may be applied to each quarter of a year. The method 10 is employed iteratively, as shown in FIG. 3, to obtain a final solution 130 as show in FIG. 2. Thereby, the present invention determines the best, or nearly best solution over the entire period of time, e.g., all four quarters of a year.

In a first example for how quantitative financial frameworks can be used for risk analysis, risk management and risk hedging of the sourcing option 54 (strategies/policies) of divisions of commoditization 60, a market consists of n number of sourcing options/alternatives 54 for capabilities of interest (i.e., including the divisions of commoditization 60 and sourcing dimensions 54). A portfolio is a set of weights $\pi_1, \pi_2, \ldots, \pi_n$ representing the proportions of the resources invested in each sourcing option 54 of capabilities. The weights are normalized so that the sum of the weights equals one. An expected return for each capability sourcing option 54 can include: using forecasts for all sources of future demand, historical data, forecasts of future economic conditions, a prediction of the value of a capability sourcing option 54 relative to the amount invested in the sourcing option 54 may be determined. A value $r_i$ for the expected return of capability sourcing option 54 i is determined. However, due to fluctuations and uncertain demand for capabilities and fluctuations and uncertain availability of capability sourcing options, future prices of capability sourcing options are variable and possibly correlated. Mathematically the fluctuations and uncertainties can be modeled by a standard deviation for each capability sourcing option 54 and a covariance (or correlation coefficient) between pairs of capability sourcing options 54. The quantities can, for instance, be estimated from historical data. A value of $\sigma^2_i$ for the variance of the price of capability sourcing option i, and $\sigma_{ij}$ for the covariance between the i-th and the j-th capability sourcing option. The expected return of the portfolio is then $\sum^n_{i=1} \pi_i r_i$ and its variance is $\sum^n_{i,j=1} \pi_i \pi_j \sigma_{ij}$, interpreting $\sigma_{ii}$ as $\sigma^2_i$. Relying on the connections between sourcing options for capabilities and financial instruments as described in the present invention, the following idea from quantitative financial frameworks carries over to the setting of determining the best or nearly best sourcing strategies of divisions of commoditization. For each feasible expected return R, the portfolio that has the lowest possible variance among all portfolios with expected return R can mathematically be solved for each feasible R:

$$\min_{\pi_1,\ldots,\pi_n} \sum_{i,j=1}^n \pi_i \pi_j \sigma_{ij}$$

$$\text{s.t } \sum_{i=1}^n \pi_i r_i = R$$

The solution to this quadratic program as a function of R is sometimes called the efficient frontier. This is Markowitz's mean-variance model for portfolio selection. The portfolio of capability sourcing options on the efficient frontier can, for instance, be used for scenario analysis from various approaches (e.g., sophisticated risk analysis, risk management and risk hedging of sourcing strategies/policies for divisions of commoditization). Another possible application of the efficient frontier, a further optimization step is carried out to find the portfolio of capability sourcing options on the frontier that maximizes utility to the entity.

In a second example for how quantitative financial frameworks can be applied to determine the best or nearly best sourcing strategies of divisions of commoditization takes time-evolution into account in the valuation. For capability sourcing option/alternative i, i=1, 2, . . . , n, treated as a financial instrument, denote $S_i(t)$ as its price at time t. The dynamics of prices of all $S_i(t)$ can be characterized by the following system of stochastic differential equations:

$$dS_i(t) = S_i(t)\left[b_i(t)dt + \sum_{j=1}^n \Sigma_{ij} dW_j(t)\right]$$

where $b_i(t)$, i=1, 2, . . . , n characterizes the instantaneous changes on average; $W_i(t)$, i=1, 2, . . . , n are n independent standard Brownian motions; and $\Sigma_{ij}$ denotes the correlation between the prices of capability sourcing option/alternative i and j.

The price can be linked to the currency in the money market, or any other type of internal currency that are used by different areas for exchanges within the entity. The value of the currency can be denoted at the time t as $S_0(t)$, and it follows a lesser volatile dynamics: $dS_0(t)=S_0(t)[R(t)dt]$, where R(t) denotes the interest rate at time t.

As in the previous example, the portfolio process $\Pi(t)=\{\Pi_i(t)\}_{i=1, 2, \ldots, n}$ can be interpreted as the distribution of the amount of resources invested in each capability sourcing option 54.

The consumption process, defined as an absolutely continuous process $c_i(t)$, denotes the increases and decreases of the resources invested in each capability sourcing option 54 not caused by the uncertainty. The consumption processes represent the actions that are applied to the capability sourcing options, such as increasing, decreasing and shifting of investment in each capability sourcing option.

Combining the consumption process actions, the wealth of the entity at time t, denoted as X(t), follows the following dynamics:

$$\frac{X(t)}{S_0(t)} = x - \int_0^t \frac{\sum_i c_i(u)}{S_0(u)} du + \int_0^t \frac{1}{S_0(0)} \Pi(u)\Sigma dW_0(u)$$

where x denotes the starting wealth, and $W_0(t)$ a standard Brownian motion.

The price and wealth processes are well-defined diffusion processes, their statistics, such as moments and quantiles, can be easily calculated, and all of these calculations can be used to describe the dynamics of the entity with full knowledge of its actions.

They can also be employed to determine actions for desirable objectives. One objective for many entities is to maximize expected profits. We can define a utility function, which is a functional of the wealth, portfolio and consumption processes, representing the profit, denoted as U(t, X(t), $\Pi(t)$, c(t)). Then the average profit maximization problem has the following formulation as a stochastic control problem:

$$\max E\left[\int_0^T U(t, X(t), \Pi(t), c(t))dt\right]$$

Under mild conditions, such as convexity of the utility function, the problem can be solved efficiently. Usually this is solved by obtaining the Hamilton-Jacobi-Bellman (HJB) equation, which is a nonlinear partial differential equation that describes the dynamics of the optimal objective function. Numerical methods can be employed for solving or approximating the HJB equation. Some special cases admit closed-form solutions. Another possibility is to use a discrete Markov chain to approximate the continuous processes introduced above, and then to produce the solution to the discrete version of the problem with dynamic programming. The discrete version serves as an approximation of the original problem. Another technique that can be employed is Monte-Carlo simulation in conjunction with nonlinear optimization, which has been recently proposed in this context.

Risk management and risk hedging correspond to an important fraction of all decision processes faced by the enormously complex entities of today, and thus such risk-based methods continuously interact with changing environments as well as other decision processes within the entity. Environmental changes include fluctuating demand, market conditions, or technology shifts. Changes also arise from decision processes, e.g., managers periodically revisit their performance targets and make adjustments which propagate further through the entity. This could potentially not only impact the value (price) of capability sourcing options, but could also affect the demand for each capability sourcing option/alternative as well as for each individual capability. As a result, the present invention includes a multi-period version of the steps of the method, including a feedback loop, as part of determining the best or nearly best sourcing strategies/policies of divisions of commoditization. For example, in one embodiment of the invention, the steps of the method may be used to determine the best or nearly best sourcing strategies/policies of divisions of commoditization over each of the individual four quarters of the yearly cycle. The present invention includes determining the best or nearly best sourcing strategies/policies of divisions of commoditization for the year by obtaining the best or nearly best sourcing strategies/policies of divisions of commoditization over all four quarters of the yearly cycle. This example is intended to be illustrative and not restrictive in any manner as the present invention includes any multi-period version of the steps of the method.

A significant amount of resources may be needed to implement changes on the sourcing strategies/policies of divisions of commoditization after conducting a risk analysis and/or risk hedging for each planning horizon separately. Therefore, one of the key challenges in a changing environment is the management of costs associated with decisions as part of the risk management and hedging of risks associated with sourcing of divisions of commoditization. These costs are sometimes called transaction costs.

Described herein below, the above examples are adapted to accommodate changes caused by the environment or by the aforementioned feedback loops, through the incorporation of transaction costs. In the first example (Markowitz mean-variance example), an epoch at which the portfolio of capability sourcing options/alternatives is adjusted. Value $A_i$ is for the amount invested in capability sourcing option/alternative i right before adjustment, and value $B_i$ is for the value immediately after adjustment. Preservation of capital implies that:

$$\sum_i B_i = \sum_i A_i + C \sum_i |A_i - B_i|$$

where C represents the transaction cost per dollar traded (which, for simplicity, is assumed to be constant across the capability sourcing options/alternatives). This constraint can be incorporated in a utility maximization procedure based on a mean-variance analysis, for instance.

In the second example, the environmental changes can be represented by introducing disruptive dynamics in the currency, and the proportional transactional cost from the currency to the stocks and the stocks to the currency, denoted by $\lambda_i$ and $\mu_i$, respectively, for each stock i. The currency will follow the new dynamics:

$$dS_0(t)=S_0(t)[R(t)dt+dZ(t)],$$

where Z(t) is a piecewise linear process representing sudden increase or decrease of the value of the currency the environments. This change then permeates to all the instruments through the change of dynamics of the price processes as follows:

$$dS_i(t) = S_i(t)\left[b_i(t)dt + dZ(t) + \sum_{j=1}^n \Sigma_{ij}dW_j(t)\right].$$

The wealth process needs to be modified as:

$$\frac{X(t)}{S_0(t)} =$$

$$x - \int_0^t \frac{\sum_i c_i(u)}{S_0(u)}du + \int_0^t \frac{1}{S_0(0)}\sum_i [(1-\mu_i)dL_i(u) + (1-\lambda_i)dM_i(u)]$$

where $L_i(t)$ denotes the total amount of currency transferred to stock i, and $M_i(t)$ denotes the total amount transferred from stock i to currency. They replace the variables $\Pi_i$ in a case where there are no transaction costs. The evaluation process and optimization remain the same for this new set of dynamics. A more general approach allows all the parameters of the model to be determined by other procedures for business processes evaluation and planning, which in turn, could rely on the output of sourcing strategies/policies of divisions of commoditization as a form of input. Therefore, sourcing strategies/policies can be integrated as a part of an adaptive risk management and risk hedging of a large scale business process management system, where any changes it introduces into the system will trigger the adjustment of the entire system.

It is understood that the illustrative formulations, formulas, methods, etc. in the above examples can be replaced by other formulations, formulas, methods, etc. from numerous probabilistic and optimization models and other quantitative financial frameworks. Possible alternatives include other stochastic dynamic programming models, deterministic dynamic programming models, iterative methods, stochastic programming, stochastic optimal control models, deterministic optimal control models, and stochastic networks. The present invention can incorporate any probabilistic and optimization models and any quantitative financial frameworks relevant to the sourcing of divisions of commoditization.

Thereby, the present invention provides a methodology for managing sourcing strategies/policies for divisions of commoditization in a quantitative framework. This includes means and methods to create new divisions of commoditization. This also includes means and methods to create new sourcing strategies/policies and other aspects of divisions of commoditization. In contrast to the current state of the art, the present invention provides methodologies based on financial instruments and on quantitative finance frameworks. The methodology includes quantitative risk analysis and portfolio management of the divisions of commoditization and the corresponding sourcing strategies/policies based on the financial instruments/quantitative frameworks. The method further includes determining the best or nearly best collection of divisions of commoditization, the best or nearly best collection of financial instruments, and the best or nearly best collection of connections between divisions of commoditization and financial instruments. Further, the method includes determining the best or nearly best collection of strategies/policies for sourcing various divisions of commoditization based on a connection to financial instruments and on quantitative finance frameworks. Additionally, the method further includes hedging against future uncertainty (e.g., demand, risk, revenue, and cost information) while meeting business objectives.

The present invention thereby generally discloses identifying divisions of commoditization, identifying different types of sourcing options/alternatives for these divisions of commoditization, and determining the portfolio of sourcing strategies/policies for said divisions of commoditization to meet objectives of interest. In a commodity management context, the present invention provides solutions to problems, for example, resulting from a company's business unit needs to define the divisions of commoditization within its organizational structure, or define the various sourcing options/alternatives available to the business unit, or determine the portfolio of sourcing options/alternatives that will be used for each division of commoditization in order for the business unit to deliver its products, services, and/or to meet business objectives. In a strategic planning context, the present invention provides solutions, for example, to problems relating to a company's corporate strategy department needing to define the strategic divisions of commoditization within the company, defining the various strategic sourcing options/alternatives available to the company, or determining the portfolio of sourcing policies that will be used by the company to meet overall corporate strategies and long-term business objectives. In an economic planning context, the present invention provides solutions to problems, for example, which arise when a government or municipality needs to define the divisions of commoditization to drive its economy, define the various sourcing options/alternatives available to the government or municipality for these divisions of commoditization, and determine the portfolio of sourcing strategies/policies that will be used by the government or municipality to meet its long-term economic objectives.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. 1-2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for commodity sourcing management, comprising:
   identifying a plurality of divisions of commoditization;
   determining a revenue associated with each division of commoditization;
   determining a market value of a capability associated with the each division of commoditization;
   identifying a plurality of strategies for the plurality divisions of commoditization, a strategy describing how the each division of commoditization can be achieved;
   identifying stocks and bonds associated with the each division of commoditization;
   correlating each strategy, the market value and the revenue associated with the each division of commoditization described in the each strategy, and stocks and bonds associated with the each division of commoditization described in the each strategy; and
   finding, based on the correlation, one or more best strategy for all the divisions of commoditization among the plurality of strategies, the one or more best strategy maximizing the revenue and the market value,
   wherein a processor coupled to a memory device performs the identifying the plurality of divisions of commoditization, the determining the revenue, the determining the market value, the identifying the plurality of strategies, the identifying the stocks and bonds, and the finding.

2. The method of claim 1, wherein the step of correlating further comprises:
   managing the plurality of divisions of commoditization and the corresponding strategies using the stocks and bonds and the correlation to hedge against future uncertainty and achieving specified business objectives.

3. The method of claim 1, further comprising:
   determining a parameter data set for the one or more best strategy; and
   generating the one or more best strategy from the correlating step and the parameter data set.

4. The method of claim 1, wherein the parameter data set includes risk levels, and cost considerations.

5. The method of claim 1, wherein the correlating step includes a risk analysis.

6. The method of claim 1, wherein the correlating step includes correlating the plurality of divisions of commoditization with the strategies based on the stocks and bonds to provide a risk analysis.

7. The method of claim 1, further comprising:
   repeating the steps of claim 1 for each of a plurality of periods of time within a specified time period; and
   selecting one or more best strategy for the specified time period.

8. The method of claim 1, further comprising:
   determining a plurality of strategies for each of the divisions of commoditization and a plurality of associated capabilities.

9. The method of claim 1, further comprising:
   determining a plurality of divisions of commoditization and associated capabilities for each commodity division;
   associating the capabilities to a job in the commodity division; and
   relating the stocks and bonds to the associated capabilities.

10. The method of claim 1, wherein a parameter set includes risk levels, and cost considerations.

11. A method for commodity sourcing management, comprising:
    providing multiple periods of time within a specified period of time;
    iterating, for each period of time, steps of:
       identifying a plurality of divisions of commoditization;
       determining a revenue associated with each division of commoditization;
       determining a market value of a capability associated with the each division of commoditization;
       identifying a plurality of strategies corresponding to the plurality of the divisions of commoditization, a strategy describing how the each division of commoditization can be achieved;
       identifying stocks and bonds associated with the each division of commoditization;
       correlating each strategy, the market value and the revenue associated with the each division of commoditization described in the each strategy, and stocks and bonds associated with the each division of commoditization described in the each strategy, the over the specified period of time finding, based on the correlation, one or more best strategy for all the divisions of commoditization among the plurality of strategies, the one or more best strategy maximizing the revenue and the market value, wherein a processor coupled to a memory device is configured to perform the providing, the iterating, the identifying the plurality of divisions of commoditization, the determining the revenue, the determining the market value, the identifying the plurality of strategies, the identifying the stocks and bonds, the correlating, and the finding.

12. The method of claim 11, wherein the step of correlating further comprises:

managing the plurality of divisions of commoditization and the corresponding strategies using the stocks and bonds and the correlation to hedge against future uncertainty and achieving specified business objectives.

13. The method of claim 11, further comprising:

determining a parameter data set for the one or more best strategy; and generating the one or more best strategy from the correlating step and the parameter data set.

14. The method of claim 11, wherein the parameter data set includes risk levels, and cost considerations.

15. The method of claim 11, wherein the correlating step includes a risk analysis.

16. The method of claim 11, wherein the correlating step includes correlating the divisions of commoditization with the strategies based on the stocks and bonds to provide a risk analysis.

17. A method for commodity management, comprising:

determining a plurality of divisions of commoditization wherein each of the divisions of commoditization include at least one capability associated with each of the divisions of commoditization;

determining a revenue associated with each division of commoditization;

determining a market value of a capability associated with the each division of commoditization;

determining a plurality of strategies associated with the plurality of the divisions of commoditization, a strategy describing how the each division of commoditization can be achieved;

determining a plurality of value instruments for associating a value to each of the divisions of commoditization, wherein at least one of the value instruments are stocks and bonds associated with the each division of commoditization;

associating each of the strategies to the value instruments;

correlating each strategy, the market value and the revenue associated with the each division of commoditization described in the each strategy, and stocks and bonds associated with the each division of commoditization described in the each strategy; and finding, based on the correlation, one or more best strategy for all the divisions of commoditization among the plurality of strategies, the one or more best strategy maximizing the revenue and the market value, wherein a processor coupled to a memory device is configured to perform the determining the plurality of divisions of commoditization, the determining the revenue, determining the market value, the determining the plurality of strategies, the determining the plurality of value instruments, the associating, the correlating, and the finding.

18. The method of claim 17, wherein the correlating step includes correlating the plurality of divisions of commoditization with associated strategies based on the value instruments including the stocks and bonds to provide a risk analysis.

19. The method of claim 17, further comprising:

repeating the steps of claim 17 for each of a plurality of periods of time within a specified time period; and selecting a best strategy for the specified time period.

20. A computer program product comprising a computer readable storage medium having recorded thereon a computer program, a computer system including the computer readable storage medium and a processor for executing the steps of the computer program for commodity sourcing management on the computer system, the program steps comprising:

identifying a plurality of divisions of commoditization;

determining a revenue associated with each division of commoditization;

determining a market value of a capability associated with the each division of commoditization;

identifying a plurality of strategies for the plurality divisions of commoditization, a strategy describing how the each division of commoditization can be achieved;

identifying stocks and bonds associated with the each division of commoditization;

correlating each strategy, the market value and the revenue associated with the each division of commoditization described in the each strategy, and stocks and bonds associated with the each division of commoditization described in the each strategy; and finding, based on the correlation, one or more best strategy for all the divisions of commoditization among the plurality of strategies, the one or more best strategy maximizing the revenue and the market value.

21. The computer program product of claim 20, wherein the step of correlating, further comprises:

managing the plurality of divisions of commoditization and the corresponding strategies using the stocks and bonds and the correlation for hedging against future uncertainty and achieving specified business objectives.

22. The computer program product of claim 20, further comprising:

determining a parameter data set for the one or more best strategy; and generating the one or more best strategy from the correlating step and the parameter data set.

23. The computer program product of claim 20, wherein the correlating step further includes:

correlating the divisions of commoditization with the strategies based on the stocks and bonds to provide a risk analysis.

24. The computer program product of claim 20, further comprising:

repeating the steps of claim 20 for each of a plurality of periods of time within a specified time period; and selecting a best strategy for the specified time period.

* * * * *